US012749605B2

(12) United States Patent
Slade et al.

(10) Patent No.: US 12,749,605 B2
(45) Date of Patent: Sep. 29, 2026

(54) HTS MAGNET RAMPING TO REDUCE SCREENING CURRENTS

(71) Applicant: Tokamak Energy Ltd, Oxfordshire (GB)

(72) Inventors: Robert Slade, Oxfordshire (GB); Rod Bateman, Oxfordshire (GB); Greg Brittles, Oxfordshire (GB); Matthew Bristow, Oxfordshire (GB); Jeroen Van Nugteren, Oxfordshire (GB); Base Van Nugteren, Oxfordshire (GB)

(73) Assignee: Tokamak Energy Ltd, Oxfordshire (GB)

( * ) Notice: Subject to any disclaimer, the term of this patent is extended or adjusted under 35 U.S.C. 154(b) by 211 days.

(21) Appl. No.: 18/713,081

(22) PCT Filed: Nov. 25, 2022

(86) PCT No.: PCT/EP2022/083314
§ 371 (c)(1),
(2) Date: May 23, 2024

(87) PCT Pub. No.: WO2023/094611
PCT Pub. Date: Jun. 1, 2023

(65) Prior Publication Data

US 2025/0029761 A1 Jan. 23, 2025

(30) Foreign Application Priority Data

Nov. 25, 2021 (GB) ..................................... 2117049

(51) Int. Cl.
*H01F 6/00* (2006.01)
*H01F 6/04* (2006.01)
*H01F 6/06* (2006.01)

(52) U.S. Cl.
CPC ............... *H01F 6/008* (2013.01); *H01F 6/04* (2013.01); *H01F 6/06* (2013.01)

(58) Field of Classification Search
CPC ... H01F 6/008; H01F 6/04; H01F 6/06; H01F 6/006

(Continued)

(56) References Cited

U.S. PATENT DOCUMENTS

2016/0049228 A1 2/2016 Schauwecker et al.

FOREIGN PATENT DOCUMENTS

JP 2017162896 A * 9/2017
WO WO-2015189786 A1 * 12/2015 ............... H01F 6/06
WO WO-2020178594 A1 * 9/2020 ............... H01F 6/06

OTHER PUBLICATIONS

International Preliminary Report on Patentability for corresponding Application No. PCT/EP2022/083314, dated May 2, 2024, 6 pages.

(Continued)

*Primary Examiner* — Sreeya Sreevatsa
(74) *Attorney, Agent, or Firm* — Dority & Manning, P.A.

(57) ABSTRACT

A method of energizing or de-energizing a high temperature superconducting, HTS, coil, from an initial transport current to a final transport current. The HTS coil includes a plurality of turns of HTS material. A transport current is supplied to the HTS coil, starting at the initial transport current and varying over time to the final transport current. Cooling is applied to the HTS coil. An operating condition of the HTS coil is monitored, which is indicative of a ratio $I/I_c$ of transport current, I, to critical current, $I_c$, of the HTS material in part of the HTS coil. The transport current applied to the coil and/or a net cooling applied to the coil are controlled in a feedback loop responsive to the operating condition, to maintain the operating condition in a desired range during (Continued)

energisation or de-energisation, such that the ratio $I/I_c$ is maintained above a threshold (e.g. 0.7).

20 Claims, 10 Drawing Sheets

(58) Field of Classification Search
USPC .......................................................... 361/141
See application file for complete search history.

(56) References Cited

OTHER PUBLICATIONS

International Search Report and Written Opinion received in corresponding Application No. PCT/EP2022/083314, dated Mar. 3, 2023, 11 pages.
Combined Search and Examination Report received in corresponding Application No. GB 2117049.3, dated May 24, 2022, 6 pages.

* cited by examiner

HTS MAGNET RAMPING TO REDUCE SCREENING CURRENTS

CROSS-REFERENCE TO RELATED APPLICATIONS

This application is the U.S. National Stage entry of International Application No. PCT/EP2022/083314, filed under the Patent Cooperation Treaty on Nov. 25, 2022, which, in turn, claims priority to Great Britain Patent Application No. 2117049.3, filed on Nov. 25, 2021, both of which are hereby incorporated herein by reference in their entireties for all purposes.

FIELD OF THE INVENTION

The present invention relates to superconducting magnets. In particular, the present invention relates to methods of ramping (i.e. energising or de-energising, changing the transport current of) a superconducting magnet and apparatus implementing those methods.

BACKGROUND

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a self-field critical temperature (the temperature above which the material cannot be superconducting even in zero external magnetic field) below about 30K. The behaviour of HTS material is not described by BCS theory, and such materials may have self-field critical temperatures above about 30K (though it should be noted that it is the physical differences in composition and superconducting operation, rather than the self-field critical temperature, which define HTS and LTS material). The most commonly used HTS are "cuprate superconductors"—ceramics based on cuprates (compounds containing a copper oxide group), such as BSCCO, or ReBCO (where Re is a rare earth element, commonly Y, Eu or Gd). Other HTS materials include iron pnictides (e.g. FeAs and FeSe) and magnesium diborate ($MgB_2$).

ReBCO is typically manufactured as tapes, with a structure as shown in FIG. 1. Such tape 100 is generally approximately 100 microns thick, and includes a substrate 101 (typically an electropolished nickel-molybdenum alloy, e.g Hastelloy™ approximately 50 microns thick), on which is deposited by IBAD, magnetron sputtering, or another suitable technique a series of buffer layers known as the buffer stack 102, of approximate thickness 0.2 microns. An epitaxial ReBCO-HTS layer 103 (deposited by metal oxide chemical vapour deposition (MOCVD) or another suitable technique) overlays the buffer stack, and is typically 1 micron thick. A 1-2 micron silver layer 104 is deposited on the HTS layer by sputtering or another suitable technique, and a copper stabilizer layer 105 is deposited on the tape by electroplating or another suitable technique, which often completely encapsulates the tape. The silver layer 104 and copper stabilizer layer 105 are deposited on the sides of the tape 100 and the substrate 101 too, so that these layers extend continuously around the perimeter of the tape 100, thereby allowing an electrical connection to be made to the ReBCO-HTS layer 103 from either face of the tape 100. These layers 104, 105 may therefore also be referred to as "cladding". Typically, the silver cladding has a uniform thickness on both the sides and edges of the tape of around 1-2 microns. Providing a silver layer 104 between the HTS layer 103 and the copper layer 105 prevents the HTS material contacting the copper, which might lead to the HTS material becoming poisoned by the copper. The parts of the silver layer 104 and copper stabilizer layer 105 on the sides of the tape 100 are not shown in FIG. 1 for clarity. FIG. 1 also does not show the silver layer 104 extending beneath the substrate 101, as is normally the case. The silver layer 104 makes a low resistivity electrical interface to, and an hermetic protective seal around, the ReBCO layer 103, whilst the copper layer 105 enables external connections to be made to the tape (e.g. permits soldering) and provides a parallel conductive path for electrical stabilisation.

In addition, "exfoliated" HTS tape can be manufactured, which lacks a substrate and buffer stack, but typically has a "surrounding coating" of silver, i.e. layers on both sides and the edges of the HTS layer. Tape which has a substrate will be referred to as "substrated" HTS tape.

An HTS cable comprises one or more HTS tapes, which are connected along their length via conductive material (normally copper). The HTS tapes may be stacked (i.e. arranged such that the HTS layers are parallel), or they may have some other arrangement of tapes, which may vary along the length of the cable. Notable special cases of HTS cables are single HTS tapes, and HTS pairs. HTS pairs comprise a pair of HTS tapes, arranged such that the HTS layers are parallel. Where substrated tape is used, HTS pairs may be type-0 (with the HTS layers facing each other), type-1 (with the HTS layer of one tape facing the substrate of the other), or type-2 (with the substrates facing each other). Cables comprising more than 2 tapes may arrange some or all of the tapes in HTS pairs. Stacked HTS tapes may comprise various arrangements of HTS pairs, most commonly either a stack of type-1 pairs or a stack of type-0 pairs and (or, equivalently, type-2 pairs). HTS cables may comprise a mix of substrated and exfoliated tape.

A superconducting magnet is formed by arranging HTS cables (or individual HTS tapes, which for the purpose of this description can be treated as a single-tape cable) into coils, either by winding the HTS cables or by providing sections of the coil made from HTS cables and joining them together. HTS coils come in three broad classes:

- Insulated, having electrically insulating material between the turns (so that current can only flow in the "spiral path" through the HTS cables).
- Non-insulated, where the turns are electrically connected radially, as well as along the cables
- Partially insulated, where the turns are connected radially with a controlled resistance, either by the use of materials with a high resistance (e.g. compared to copper), or by providing intermittent insulation between the coils.

Non-insulated coils could also be considered as the low-resistance case of partially insulated coils.

One example use of HTS field coils is in tokamak plasma chambers, where any or all of the poloidal field coils or toroidal field coils may be implemented as HTS coils. This is of particular use in spherical tokamaks, where the current density in the central column of the toroidal field coils is a key design parameter.

In the following discussion a magnet is defined as comprising a number of HTS coils connected in series.

Energising or charging a non-insulated or partially insulated HTS magnet is more complex than energizing a fully insulated coil as the current can take two paths, either around the spiral high inductance path, or through the radial low inductance path. The spiral path has negligible resistance when the coil is fully superconducting, whilst the radial path is resistive. During energization (ie: ramping the coil by applying a voltage from a power supply to the terminals to drive a transport current), the inductive voltage developed by changing current in the spiral path will drive some of the power supply current into the radial path. The exact split in current can be calculated as known in the art. If the ramp rate is increased, more current flows in the radial path, causing more heating. In large coils, the maximum ramp rate will be set by the available cooling power, ie: the heating caused by radial current flow during ramping must not cause the coil temperature to increase so much that it become non-superconducting.

After ramping the power supply voltage drops to the level needed only to drive current through the residual resistance of the spiral path of magnet. The magnet then enters the "stabilisation phase", where the magnet is maintained at the operating current for sufficient time for the magnetic field to stabilise.

The instabilities in the magnetic field arise from parasitic currents induced in the magnet (in addition to the desired transport current), which each contribute towards the magnetic field of the magnet. These currents come in three types:

- "Eddy currents", which are closed loops of current induced in non-superconducting ("normal") components.
- "Coupling currents", which are closed loops of current induced in nearby superconducting components joined by a normal medium—these flow along one superconducting component, through the normal medium, and then along the other superconducting component and back through the normal medium to complete the loop.
- "Screening currents", also known as "hysteresis currents" or "shielding currents", which are closed loops of current flow solely in the superconducting material.

The phrase "closed loop of current" means that the current flows entirely within the specified material(s), and does not start or terminate at the power supply or current leads.

In the case of HTS coated conductors, such as REBCO, the screening currents flow in each individual length of continuous defect-free tape, flowing along one edge and returning along the other edge. Therefore the loop current in each generates a small magnetic field, called a screening field because it is generated by supercurrents that are induced with orientation that tends to inhibit the magnet flux generated by the rest of the magnet from penetrating the tape.

In "steady state" applications, where the magnetic field of the magnet does not change quickly, the eddy currents and coupling currents will decay quickly (exponentially, with a time constant on the order of a few seconds), due to the resistance of the materials they travel through. However, screening currents will persist indefinitely, and change over long timescales (with a time constant on the order of minutes, hours, or even months). The screening currents also depend on the ramping history of the magnet—meaning that a magnet ramped up quickly will have different screening currents (and therefore a different magnetic field quality) to an identical magnet ramped up slowly, and that a magnet configured to produce 5T which is ramped-up to 5T from a zero-current state will have different field quality to the same magnet ramped up to 5T from a previous steady 3T state.

The magnetic field generated by a superconducting magnet therefore depends on its previous ramp history. It is possible to reset the magnet to a virgin state with no screening currents by raising its temperature above the superconducting transition temperature.

The effect of screening currents is particularly pronounced in HTS magnets using ReBCO or BSCCO tapes, as the large dimension of the superconducting filaments allows larger screening currents to form. The polluting magnetic "screening field" created by screening currents is a severe problem for application of existing HTS tape and coil technology in applications that demand high field homogeneity and stability, such as nuclear magnetic resonance (NMR) and magnetic resonance imaging (MRI).

There are a number of methods to reduce the impact of screening currents. The magnet may be ramped up in an oscillatory manner, the magnet may be "shimmed" (i.e. applying a corrective field using a secondary coil), etc.

A further problem created by screening currents is the local stress created by the screening currents flowing in the edges of tapes. It has been theorized that this stress is enough to degrade the critical current of the tapes by locally crushing the REBCO crystal structure. It is therefore possible for the ultimate performance of a magnet to be degraded on its first ramp by the generation of screening currents.

Recent research has found that screening current contribute massively to the stress and strain experienced by an HTS coil, both during stable operation and during ramp-up (Jing Xia et al 2019 *Supercond. Sci. Technol.* 32 095005), with forces being as much as five times higher than they would be in the absence of screening currents. While many of the above techniques can achieve a reduction in screening currents during steady-state operation, they still result in the potential for large screening currents during ramp-up, which could cause excessive force on the coil.

Therefore there exists a need for a better method of reducing or ideally eliminating formation of screening currents in an HTS magnet during ramp-up.

SUMMARY

According to a first aspect, there is provided a method of energizing or de-energizing a high temperature superconducting, HTS, coil, from an initial transport current to a final transport current. The HTS coil comprises a plurality of turns of HTS material. A transport current is supplied to the HTS coil, the transport current starting at the initial transport current and varying over time to the final transport current. Cooling is applied to the HTS coil. An operating condition of the HTS coil is monitored, wherein the operating condition is indicative of a ratio $I/I_c$ of the transport current, I, to a critical current, $I_c$, of the HTS material in at least a part of the HTS coil. One or both of the transport current applied to the coil and a net cooling applied to the coil are controlled in a feedback loop responsive to the operating condition, in order to maintain the operating condition in a desired range during energisation or de-energisation, such that the indicated ratio $I/I_c$ is maintained above a threshold ratio (e.g. above 0.7) and preferably less than 1.

According to a second aspect, there is provided a method of energizing or de-energizing a high temperature superconducting, HTS, coil, from an initial transport current to a final transport current. The HTS coil comprises a plurality of turns of HTS material. A transport current is supplied to the HTS coil, the transport current starting at the initial transport current and varying over time to a final transport current. A non-inductive component of the start to end voltage across the HTS coil is monitored. Cooling is applied to the HTS coil to maintain the temperature of the HTS material at or below the zero field critical temperature of the HTS material.

One or both of the rate of change of transport current; or the net cooling power applied to the coil are controlled, where the net cooling power comprises the applied cooling and any applied heating of the coil. The control is such that the non-inductive component of the start-to-end voltage across the HTS coil remains above a threshold at least until the transport current is equal to the final transport current.

According to a third aspect, there is provided a method of energizing or de-energizing a high temperature superconducting, HTS, coil, from an initial transport current to a final transport current. The HTS coil comprises a plurality of turns of HTS material. A transport current is supplied to the HTS coil, the transport current starting at the initial transport current and varying over time to a final transport current. Temperature of the HTS coil is monitored. Cooling is applied to the HTS coil to maintain the temperature of the HTS material at or below the zero field critical temperature of the HTS material. One or both of the rate of change of transport current or the net cooling power applied to the coil are controlled, where the net cooling power comprises the applied cooling and any applied heating of the coil. The control is such that the rate of change of temperature of the HTS coil does not exceed a predetermined threshold dependent upon the controlled rate of change of transport current and/or net cooling power.

According to a fourth aspect, there is provided a high temperature superconducting, HTS, magnet system. The HTS magnet system comprises and HTS coil, a power supply, a cooling system, a voltage monitoring system, and a controller. The HTS coil comprises a plurality of turns of HTS material. The power supply is configured to supply a transport current to the HTS coil. The cooling system is configured to apply cooling to the HTS coil to maintain the temperature of the HTS material at or below the zero field critical temperature of the HTS material. The voltage monitoring system is configured to monitor the start-to-end voltage of the HTS coil. The controller is configured to control ramping of the magnet. The controller controls ramping of the magnet by:

- causing the power supply to provide a transport current which starts at an initial transport current and varies over time to a final transport current; and
- determining the non-inductive component of the monitored start-to-end voltage of the HTS coil;
- controlling one or both of:
  - the rate of change of transport current;
  - the net cooling power applied to the coil, where the net cooling power comprises the cooling applied by the cooling system and any applied heating of the coil;
- such that the non-inductive component of the start-to-end voltage of the HTS coil remains above a threshold at least until the transport current is equal to the final transport current.

According to a fifth aspect, there is provided a high temperature superconducting, HTS, magnet system. The HTS magnet system comprises an HTS coil, a power supply, a cooling system, and a controller. The HTS coil comprises a plurality of turns of HTS material. The power supply is configured to supply a transport current to the HTS coil. The cooling system is configured to apply cooling to the HTS coil to maintain the temperature of the HTS material at or below the zero field critical temperature of the HTS material. The controller is configured to control ramping of the magnet. The controller controls the ramping of the magnet by:

- causing the power supply to provide a transport current which starts at an initial transport current and varies over time to a final transport current;
- controlling one or both of:
  - the rate of change of transport current; or
  - the net cooling power applied to the coil, where the net cooling power comprises the applied cooling and any applied heating of the coil;
- such that the rate of change of temperature of the HTS coil does not exceed a predetermined threshold dependent upon the controlled rate of change of transport current and/or net cooling power.

DETAILED DESCRIPTION

Figure 1:
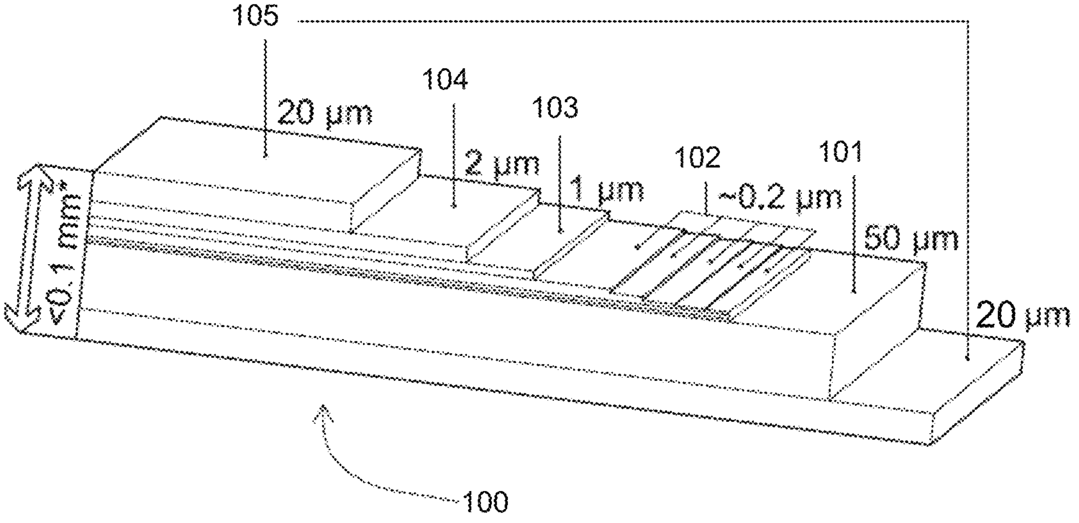
FIG. 1 is a diagram of a ReBCO tape.

As previously described in WO 2020/178594 A1, screening currents arise in the "spare" capacity of an HTS magnet—i.e. the maximum amplitude of the screening currents is the difference between the critical current of the HTS, and the transport current in the HTS.

The critical current of an HTS conductor is conventionally defined as the current at which the HTS conductor generates 100 microvolts over 1 m of length. The critical current of the HTS will depend on the temperature, external magnetic field intensity and orientation, and strain on the HTS. As an alternative definition, screening currents will exist in the HTS whenever it is below saturation—above saturation (i.e. in the conditions where screening currents are eliminated), the HTS will shed current into electrically connected non-superconducting conductors. Within an HTS magnet this will arise as current flow in the cladding of the HTS or in the radial current path between turns in a non-insulated or partially-insulated HTS coil. Where the critical current $I_C$ is used in the below description, this may be replaced with "the current at which the HTS enters the saturated state and begins to shed current into non-superconducting elements".

Saturation may be detected in several ways:

Where the critical current of the HTS in given conditions is known theoretically or experimentally, saturation may be determined by comparing the transport current and the known critical current;

The non-inductive start-to-end voltage of the HTS coil may be measured, with a non-zero voltage indicating that the coil is approaching saturation and a voltage above 100 microvolts per meter of HTS conductor indicating that the coil is at or above its critical current. One way to measure the non-inductive component of the start-to-end voltage is to measure the total start-to-end voltage of the coil, and subtract the start-to-end voltage of an open circuit co-wound coil. Some correction may be applied for the minor deviation in self-inductance of the co-wound coil and the HTS coil due to imperfect coupling, but for co-wound coils this deviation is generally insignificant. Another approach that does not require a co-wound coil is to measure the total start-to-end voltage and to determine the non-inductive component based on a model or other knowledge about the magnet.

In non-insulated and partially insulated magnets, saturation will be characterised by onset of "rollover" of the magnetic field, where the rate of change of the magnetic field with the transport current decreases due to shedding of current into the non-superconducting radial path.

In non-insulated and partially insulated magnets, saturation will be characterised by a change in the rate of change of coil temperature, due to the additional Joule heating in those turns that are shedding current to adjacent turns.

As described in the above referenced document, screening currents can be eliminated from some or all turns in some or all coils in the magnet during steady-state operation (or other normal operation) by running some or all of the magnet's coils (and the turns in those coils) at saturation—i.e. with current shedding radially between turns, driven by non-inductive voltage due to the HTS being run close to or above critical current—for certain magnets. However, this operation mode is not suitable for many magnets. For example, large partially insulated magnets may overheat due to Joule heating and quench, and there would be a tradeoff between the low turn-to-turn resistance needed for stable saturated operation and the low time constant L/R needed to allow the magnet to be ramped up in reasonable time. In addition, screening currents and the stresses they induce would still present a problem during ramping up of the magnet, when the transport current has not yet reached saturation, or during ramping down of the magnet where the transport current will fall below saturation.

Figure 2:
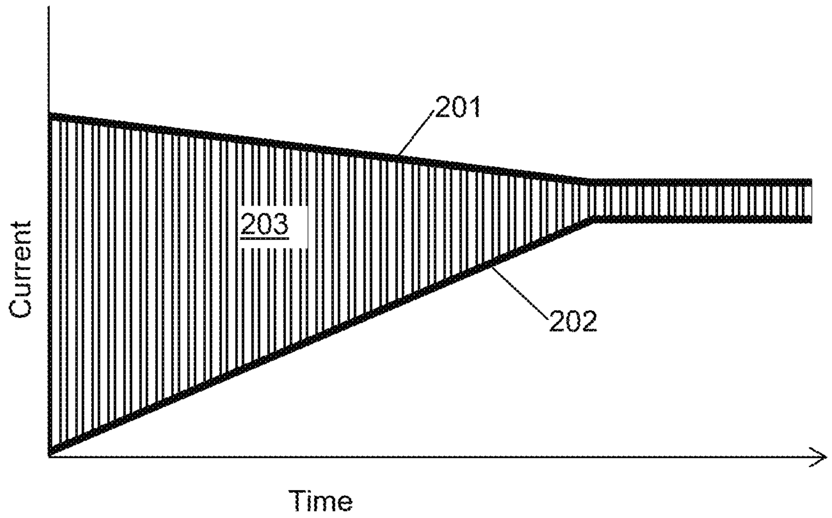
FIG. 2 is a graph of critical current and transport current for a magnet ramped up according to a conventional technique.

As illustrated in FIG. 2 (not to scale), for a magnet at constant temperature, the critical current $I_C$ 201 will reduce as the transport current 202 of the magnet is ramped up (due to the effect of the increasing magnetic fields, stress, and strain on the magnet). This means that at the initial stages of the ramp, the ratio $I/I_C$ is very small—allowing for large screening currents to arise in the "unused" current region 203. As described in Jing Xia et al (see background) such large screening currents can cause large forces on the HTS coil during ramp-up, potentially damaging the coil and reducing performance.

As such, a method of ramping a magnet between a first transport current and a second transport current is proposed below where the magnet is kept at or near saturation during the ramp of the magnet, at least until the second transport current is reached. In this way, the potential screening currents induced in the magnet during the ramp are limited (difference between the transport current and the critical current will be small), and thereby the stresses on the magnet during the ramp are reduced.

Figure 3A:
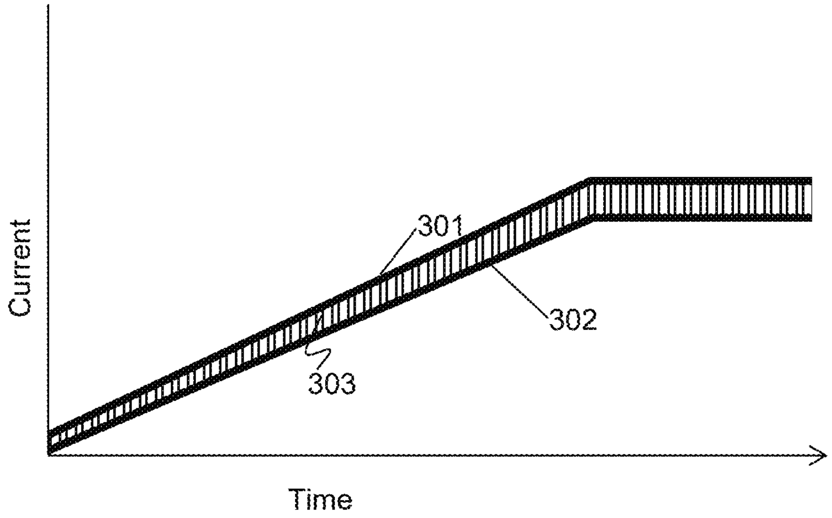
FIG. 3A is a graph of critical current and transport current for an exemplary method of ramping an HTS coil.

FIG. 3A shows a graph of critical current 301 and transport current 302 against time during ramp-up of an example magnet. Again, this is for illustration purposes and is not to accurate scale. As can be seen, the critical current is initially low, and is increased during the ramp-up by varying environmental factors as described in more detail below. This is done such that the ratio $I/I_c$ between the transport current I and the critical current $I_c$ is always above a threshold ratio (e.g. greater than 0.7, greater than 0.75, greater than 0.8, greater than 0.9, or greater than 0.95), and the "unused" current region 303 is significantly reduced when compared to FIG. 2. During the ramp up, the ratio $I/I_c$ between the transport current and the critical current is less than 1, or in cases where current can flow in the HTS even with an $I/I_c$ ratio above 1 (e.g. as disclosed in WO 2020/178594 A1, in a partially insulated magnet with sufficient cooling), sufficiently low that current can flow in the HTS material.

Achieving this requires controlling the critical current of the magnet with some level of independence from the transport current. This can be achieved by controlling the temperature of the magnet (i.e. of the HTS material).

Figure 3B:
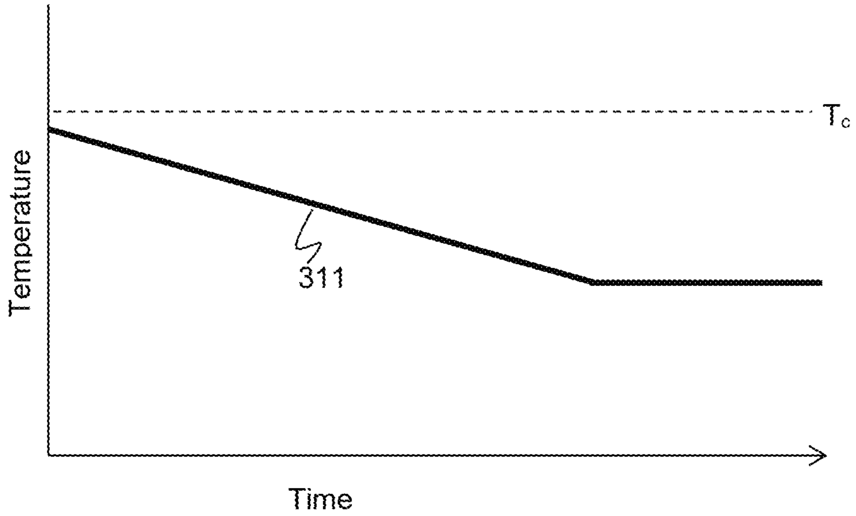
FIG. 3B is a graph of temperature during the ramp-up method of FIG. 3A.

FIG. 3B shows a graph of temperature 311 against time during ramp-up of the toroidal field coil used in FIG. 3A, with the same time axis scale. As can be seen, the control over the critical current 301 can be implemented by gradually reducing the temperature 311 of the magnet as the magnet ramps up, starting from a value below the critical temperature $T_C$ of the magnet, and finishing at the intended operating temperature of the magnet.

Temperature control of the magnet, or in general control of the net cooling power applied to the magnet, can be achieved by varying the cooling provided by the magnet cooling system, and/or by the use of additional heating during the early stages of ramping-up. The additional heating may be provided by resistive heaters placed adjacent to the magnet or integrated within it. Alternatively, or in addition, additional heating may be provided by adjusting the ramp rate (i.e. the rate of change of transport current), so that the inductive voltage developed drives a proportion of transport current in the radial path. This will result in heating of the magnet due to the radial path being resistive. The heat resulting from driving current through the radial path will generally be evenly distributed (to the extent that resistive connections between turns are evenly distributed in the magnet), and unlike the use of integrated resistive heaters does not require additional space within the magnet coils. This applies to the example of FIGS. 3A and B, as well as to other examples in this disclosure involving control of temperature and/or net cooling power.

The required values of the temperature to achieve a particular critical current at a particular transport current will depend on the magnet, and can be predetermined by simulation as known in the art, or can be calibrated on-the-fly by a suitable feedback mechanism. In general, the critical current will increase as the temperature decreases, and therefore the ramp-up process will involve cooling the magnet as the transport current is increased.

While FIGS. 3A and B and other examples in this disclosure may use a TF coil for illustrative purposes, the same principles apply to any HTS coil.

Figure 4A:
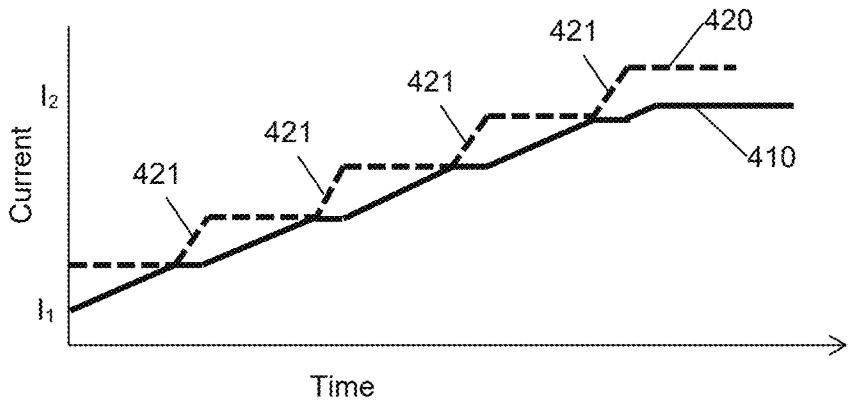
FIGS. 4A, B, and C show an alternative exemplary method for ramping up a magnet.
Figure 4B:
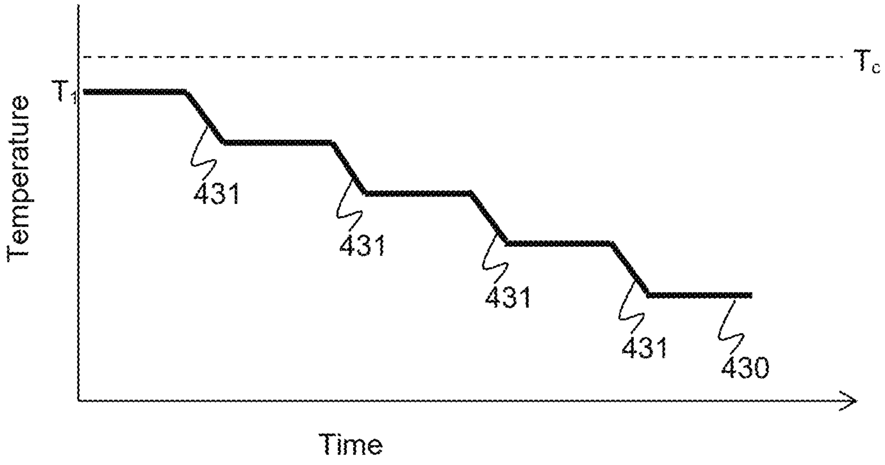
Figure 4C:
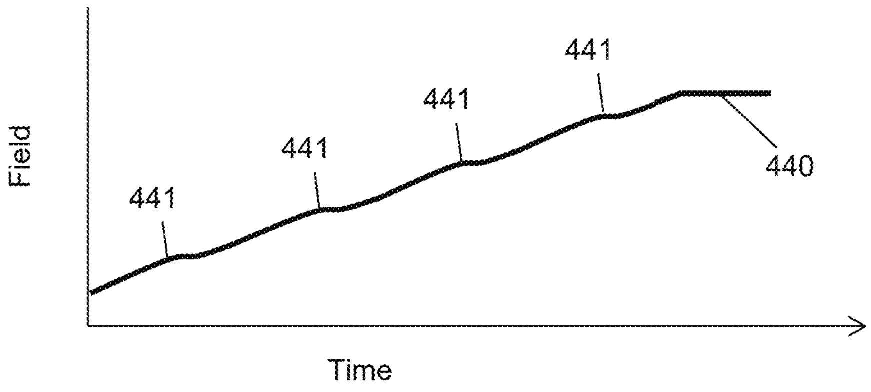

FIGS. 4A, B, and C show an alternative scheme for ramping up a magnet, where the temperature is varied in a stepwise fashion. As FIG. 4A is a graph of transport current I 410 and critical current $I_C$ 420 against time, FIG. 4B is a graph of coil temperature 430 against time, and FIG. 4C is a graph of the magnetic field 440 produced by the coil against time. All three graphs use the same time-axis scale. These are intended as illustrative only, and are not presented to exact scale. The coil is initially at a transport current $I_1$ and temperature $T_1$, and the transport current is ramped up while holding the temperature steady and monitoring the magnetic field of the coil. This continues until "roll over" 441 of the magnetic field is detected, i.e. the rate of change of the coil magnetic field with current decreases, indicating that the coil approaching saturation. The temperature of the coil is then decreased 431 in order to increase the critical current $I_C$ 421 and hence decrease the ratio $I/I_C$ to the threshold described in the previous examples. The transport current is then ramped up again until a further rollover 441 is detected, at which point the temperature is decreased again as described above, and the cycle continues until the transport current reaches the desired final transport current $I_2$.

As in the previous examples, the $I/I_c$ threshold may be, for example, greater than 0.7 times the critical current, greater than 0.75 times the critical current, greater than 0.8, greater than 0.9, or greater than 0.95.

For the initial ramp-up of a coil, i.e. where the initial transport current for the ramp is zero or near-zero, maintaining an $I/I_C$ ratio above a given threshold would require $I_C$ to also be zero or near-zero. One possible method for initiating the ramp-up is to provide a small amount of initial current to the coil before cooling it below the critical temperature of the HTS (i.e. while the HTS is not superconducting), and then cool the HTS below the critical temperature to a point where the ratio between the initially supplied current and the critical current is above the desired $I/I_C$ ratio. An alternative which avoids the need to supply current to the coil when the HTS is not superconducting is to set the initial temperature of the coil such that the ratio $I/I_C$ will be above the threshold at a predetermined small but non-zero current $I_0$. The coil is then ramped up from zero transport current to the point where the transport current equals the predetermined current $I_0$, while maintaining that initial temperature. The ramp is then continued from the predetermined current $I_0$ to the final target transport current using one of the methods previously described, i.e. with the predetermined current acting as the "initial current" for those methods. Similar measures may be taken for the final ramp-down of a coil, i.e. where the final transport current is equal to zero. As such, where "initial transport current" and "final transport current" are used, particularly for examples relying on the ratio $I/I_c$, they may be non-zero currents.

Figure 5:
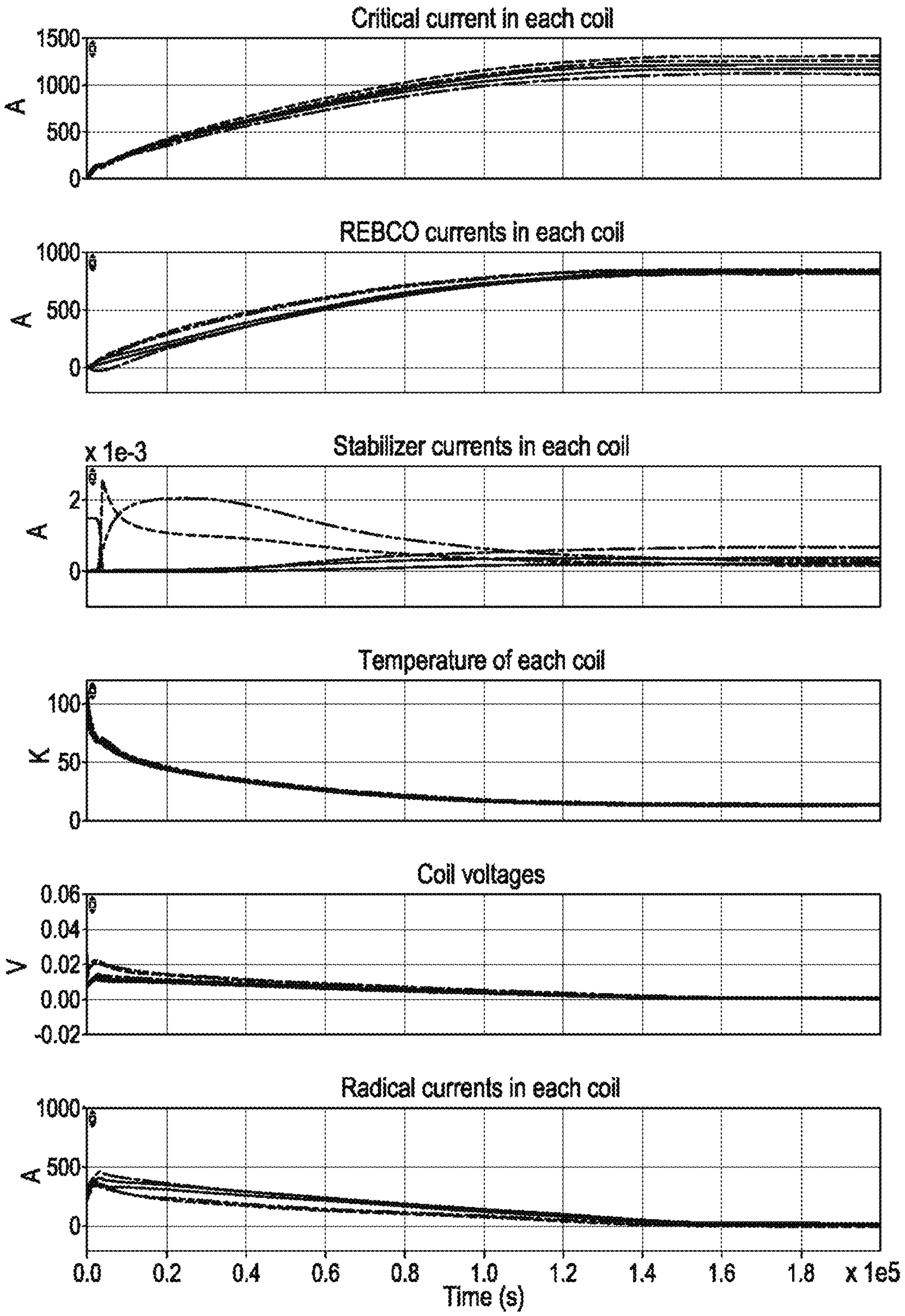
FIG. 5 is a series of graphs showing modelled performance of an HTS magnet comprising several field coils during a further alternative exemplary method of ramping the magnet.
Figure 5:
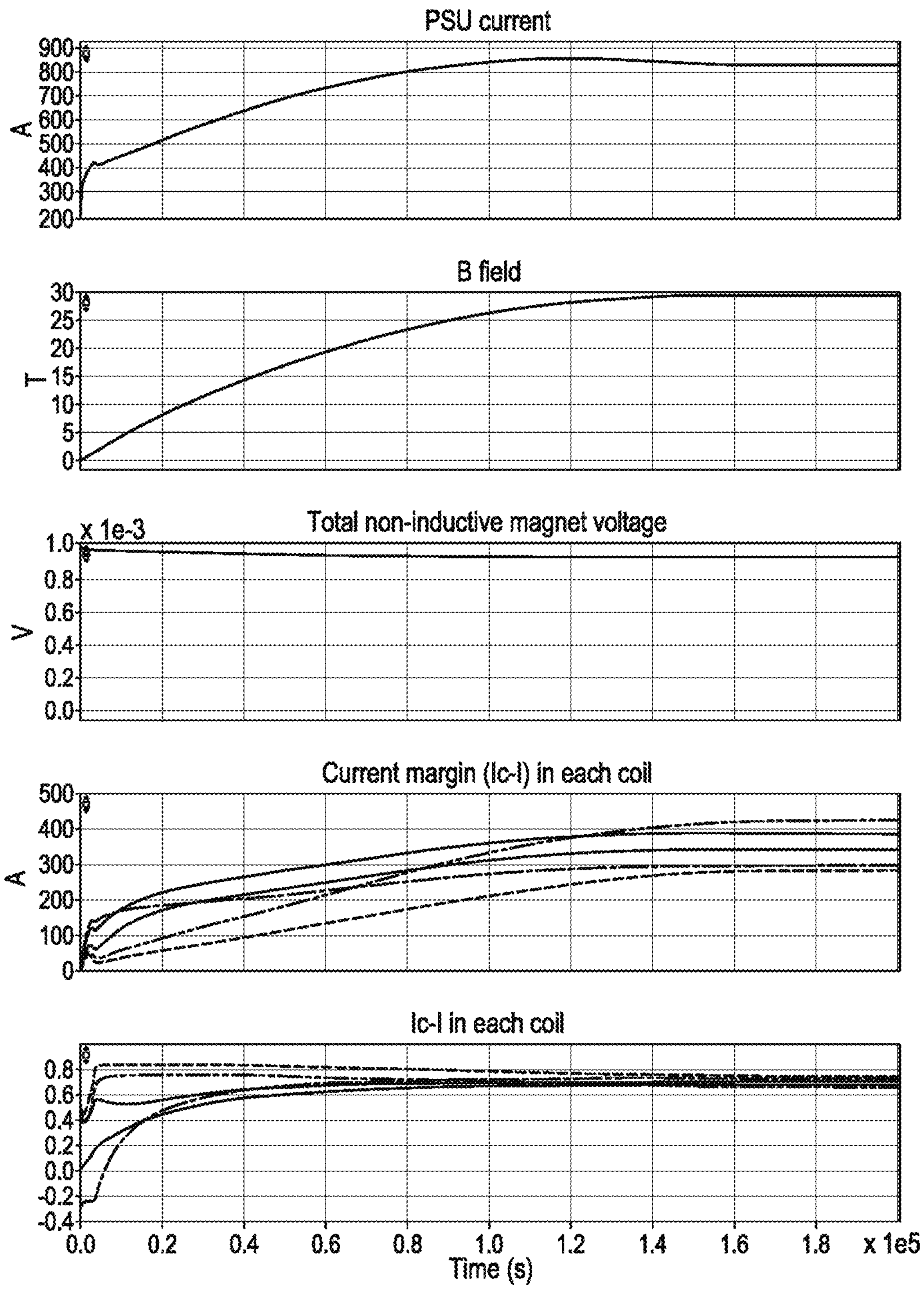

The modelled results of an alternative control scheme are illustrated in FIG. 5. FIG. 5 is a sequence of graphs of different properties of a magnet over time during energisation of the magnet. In this example, a magnet comprising several HTS field coils is ramped up such that the non-inductive start-to-end voltage is kept approximately constant around 1 mV. The non-inductive start-to-end voltage is the voltage across all HTS coils, disregarding contributions due to inductive voltages on the coils (ie: voltages induced by a rate of change of current). This is measured by, for example, monitoring the total voltage across the coils, and then correcting this by vector subtracting the voltage across a co-wound or otherwise inductively coupled secondary coil. The net cooling power applied to the coil (which may be controlled by varying the output of coil heaters), or ramp rate (i.e. the rate of change of transport current), are controlled to maintain the target non-inductive voltage. This method of ramping keeps the coil near-saturation during the ramp, effectively maintaining the $I/I_C$ ratio above a threshold as described earlier. As can be seen from the graphs in FIG. 5, the $I/I_C$ ratio in each of the HTS coils remains relatively high after the initial portion of the ramp, and the current margin (i.e. "spare" current in which screening currents could form) remains low throughout the ramp. It will also be appreciated from FIG. 5 that the critical current of the HTS material varies in different parts of the magnet, due to factors including local temperature and magnetic field, but that the $I/I_C$ ratio can be maintained above a threshold in at least a part of the coil. This control scheme can be implemented as a feedback loop which monitors the non-inductive start-to-end voltage and controls the ramp current to maintain that non-inductive start-to-end voltage above a threshold (or at a constant value). Example thresholds may at least 0.5 microvolts per meter of HTS conductor length (μV/m), at least 1 μV/m, at least 10 μV/m, or at least 100 μV/m (which will approximately correspond to running at $I>I_C$).

Equivalently, this may be performed for a single-coil system, or the measurements may be made separately for each coil in a multi-coil system (with the control system balancing the need to keep the currents in the coils balanced, with the need to keep the non-inductive start-to-end voltage of each coil above the chosen threshold).

The secondary coil may be co-wound with the HTS coil, e.g. as backing wire on the HTS conductors of the coil, or it may be provided in close proximity to the HTS coil, e.g. integrated into assemblies bonded onto the side of the coil to provide connection to other HTS coils, such as those disclosed in WO 2020/079412 A1.

The secondary coil may be connected at one end to a corresponding end of the HTS coil, and the voltage measured between the other end of the secondary coil and the other end of the HTS coil (hereafter the "pickup voltage"). The non-inductive component of the start-to-end voltage across the HTS is then the difference between the measured start-to-end voltage of the HTS coil and the pickup voltage.

Figure 6A:
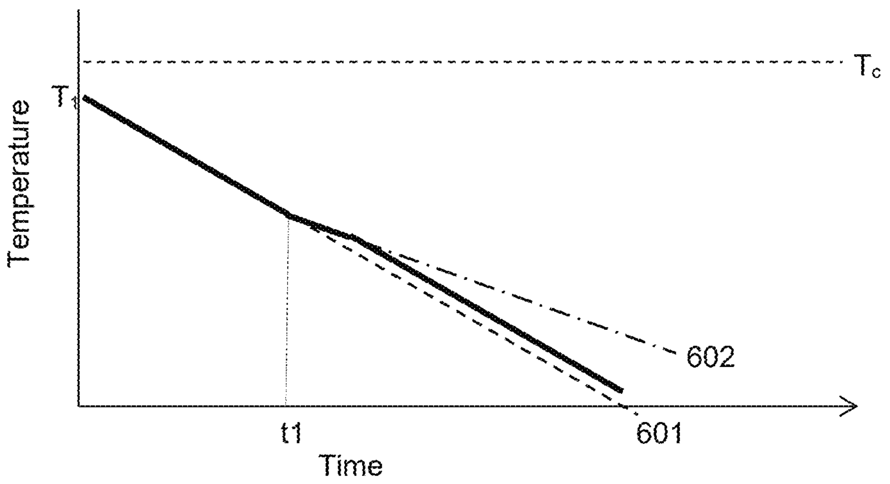
FIG. 6A is a graph of temperature against time for an exemplary method of energising or de-energising a magnet.
Figure 6B:
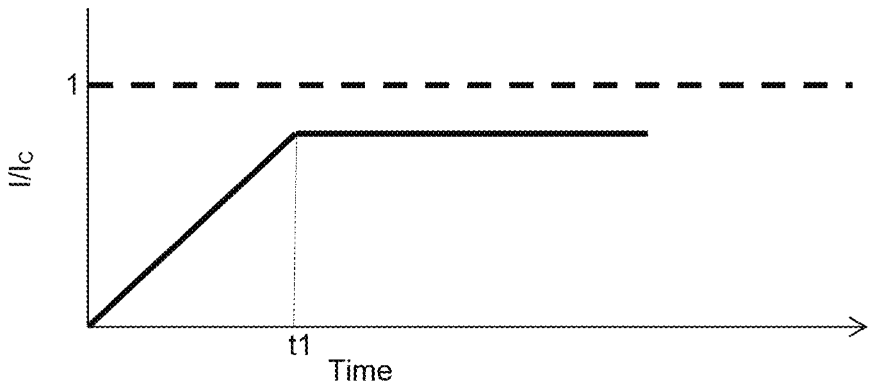
FIG. 6B is a graph of current against time for the same method as FIG. 6A.

Another alternative control scheme is illustrated in FIGS. 6A and 6B. In this example, a magnet comprising several HTS field coils is ramped up and the coil temperatures accurately monitored (FIG. 6A). The coil heaters, or ramp rate, are controlled to maintain the target rate of coil temperature decrease as indicated by slope 601. At time t1, the rate of decrease slows to a slope 602, this indicates some parts of the magnet are entering saturation. The heater power or the coil ramp rate is decreased by the control system to keep the (negative) rate of coil temperature change within the desired range, e.g. returning to a temperature decrease with slope 601. This method of ramping keeps the coil near-saturation during the ramp, effectively maintaining the $I/I_C$ ratio above a threshold as described earlier. As can be seen from FIG. 6B, the $I/I_C$ ratio in each of the HTS coils remains relatively high after the initial portion of the ramp, and the current margin (i.e. "spare" current in which screening currents could form) remains low throughout the ramp. This control scheme can be implemented as a feedback loop which monitors the coil temperatures and controls the ramp current or net cooling power to maintain the rate of change of temperature below a threshold, within a given range, or at a constant value. Suitable thresholds (or ranges or values)

depend on the particular characteristic of the magnet, but the expected temperature decrease for given known heat inputs (i.e. ramp rate, cooling power, and any applied heating from heaters or the like) can be readily determined by the skilled person by modelling or simulation methods as well known in the art, or determined through calibration of the HTS coil, and may then be used to calculate the expected rate of change of temperature for a given saturation and thereby determine an appropriate threshold or range.

While the above examples have focused on ramping-up of the coil, i.e. where the initial transport current is less than the final transport current, it will be appreciated that the same principles apply to ramp-down of the coil, i.e. where the initial transport current is greater than the final transport current. In this case, the critical current $I_C$ is reduced as the magnet is ramped down (e.g. by increasing the coil temperature), in order to maintain the ratio of the transport current and the critical current $I/I_C$ above the desired threshold.

The variation in the transport current between the initial transport current and the final transport current may be a monotonic variation (i.e. always increasing or steady for ramp-up, or always decreasing or steady for ramp-down), or it may be a non-monotonic variation. The important characteristic for the above examples is the ratio $I/I_C$, and thereby the "spare capacity" in which screening currents may form, rather than the particular nature of the ramp.

Other measures for controlling screening currents in steady state coils may be used following the ramp—e.g. oscillating the transport current or applying an oscillating external magnetic field to scramble the screening currents and reduce their net effect on the final field.

Figure 7:
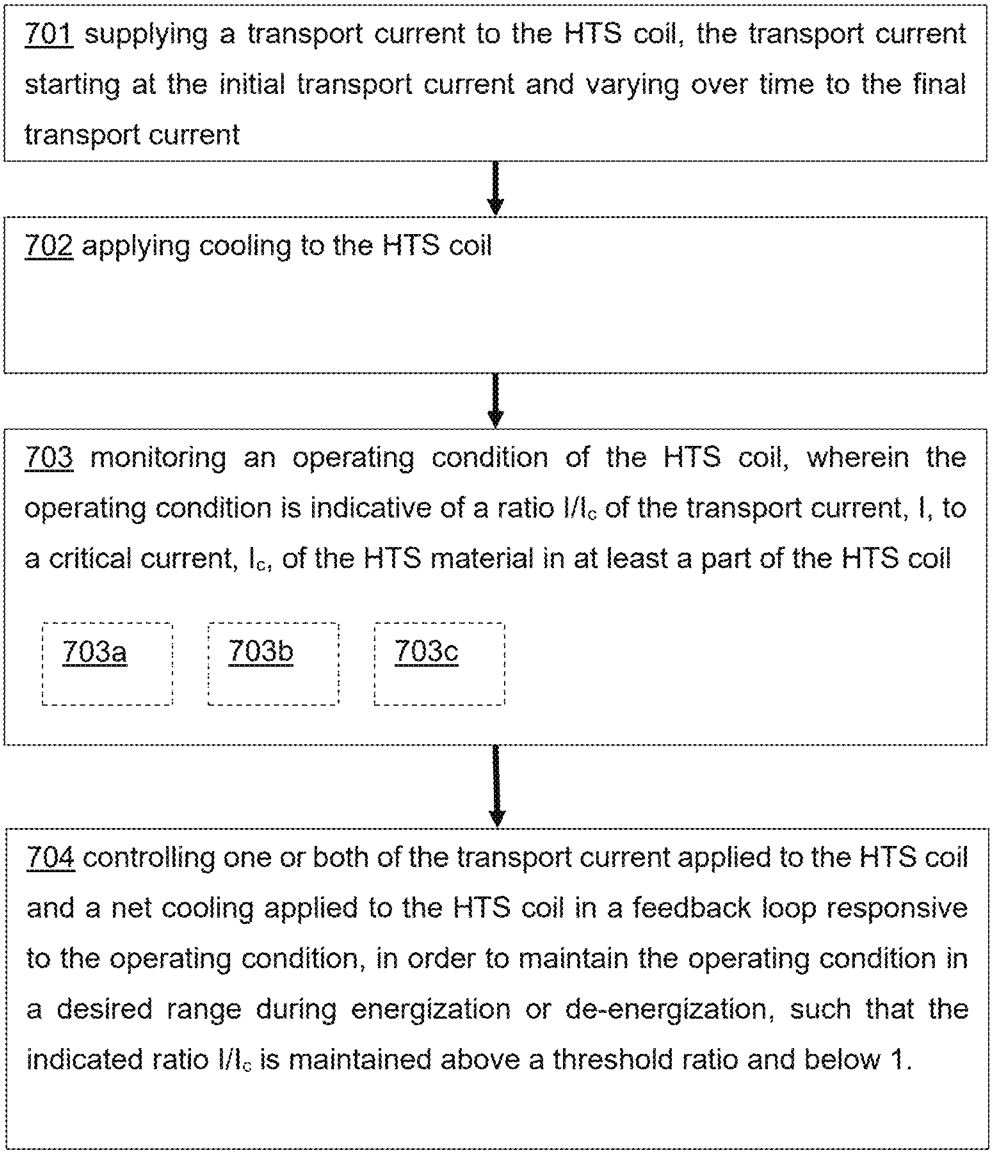
FIG. 7 is a flowchart of a method of energizing or de-energizing a high temperature superconducting, HTS, coil.

FIG. 7 is a flowchart of a method of energizing or de-energizing a high temperature superconducting, HTS, coil, from an initial transport current to a final transport current, the HTS coil comprising a plurality of turns of HTS material.

The method comprises:

701: supplying a transport current to the HTS coil, the transport current starting at the initial transport current and varying over time to the final transport current;

702: applying cooling to the HTS coil;

703: monitoring an operating condition of the HTS coil, wherein the operating condition is indicative of a ratio $I/I_c$ of the transport current, I, to a critical current, $I_c$, of the HTS material in at least a part of the HTS coil;

704: controlling one or both of the transport current applied to the HTS coil and a net cooling applied to the HTS coil in a feedback loop responsive to the operating condition, in order to maintain the operating condition in a desired range during energization or de-energization, such that the indicated ratio $I/I_c$ is maintained above a threshold ratio and below 1.

The operating condition may be a non-inductive component of the start-to-end voltage across the HTS coil. The non-inductive component of the start-to-end voltage across the HTS coil may be monitored by monitoring a total start-to-end voltage across the HTS coil and determining the non-inductive component by one of

703*a*: subtracting a pre-calculated inductive voltage dependent on a rate of change of transport current;

703*b*: modelling of the HTS coil, the model taking as input at least the total start-to-end voltage, the transport current, a monitored temperature of the HTS coil, and a monitored magnetic field produced by the HTS coil; or

703*c*: determining the non-inductive component as a difference between the total start-to-end voltage and a voltage across a pickup coil co-wound or inductively coupled with the HTS coil.

Figure 8:
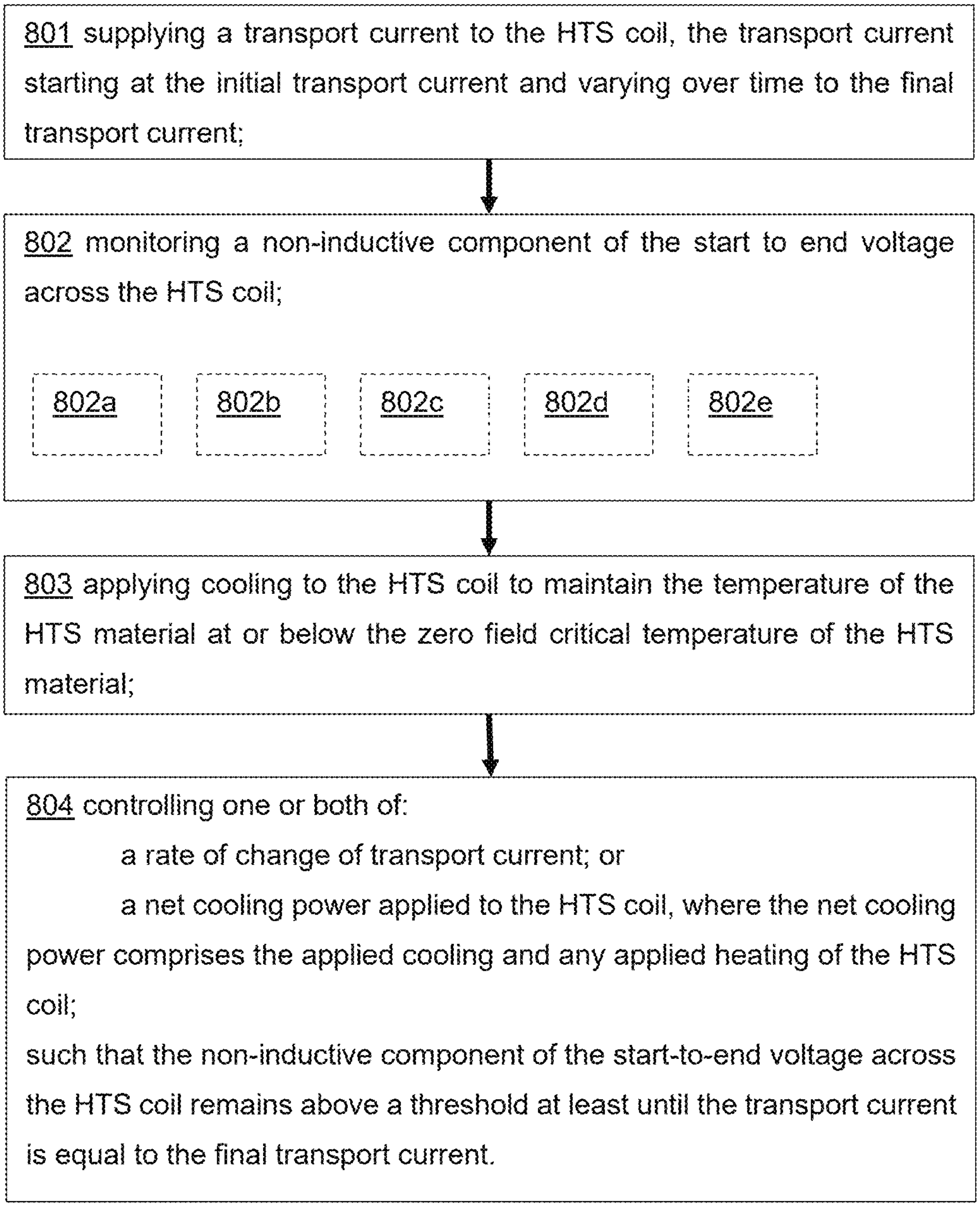
FIG. 8 is a flowchart of a further method of energizing or de-energizing a high temperature superconducting, HTS, coil.

FIG. 8 is a flowchart of a further method of energizing or de-energizing a high temperature superconducting, HTS, coil, from an initial transport current to a final transport current, the HTS coil comprising a plurality of turns of HTS material.

The method comprises:

801: supplying a transport current to the HTS coil, the transport current starting at the initial transport current and varying over time to the final transport current;

802: monitoring a non-inductive component of the start to end voltage across the HTS coil;

803: applying cooling to the HTS coil to maintain the temperature of the HTS material at or below the zero field critical temperature of the HTS material;

804: controlling one or both of:

- a rate of change of transport current; or
- a net cooling power applied to the HTS coil, where the net cooling power comprises the applied cooling and any applied heating of the HTS coil;

such that the non-inductive component of the start-to-end voltage across the HTS coil remains above a threshold at least until the transport current is equal to the final transport current.

Monitoring the non-inductive component may comprise:

802*a*: monitoring a total start to end voltage of the HTS coil and determining the non-inductive component by subtracting a pre-calculated inductive voltage dependent on the rate of change of transport current;

802*b*: monitoring a total start to end voltage of the HTS coil and determining the non-inductive component by modelling of the HTS coil, the model taking as input at least the total start to end voltage, the transport current, a monitored temperature of the HTS coil, and a monitored magnetic field produced by the HTS coil.

802*c*: monitoring a total start to end voltage of the HTS coil;

802*d*: monitoring a pickup voltage which is the voltage between a first end of the HTS coil and first end of a co-wound pickup coil, wherein the pickup coil is directly electrically connected at a second end to the second end of the HTS coil, and is not directly electrically connected to the HTS coil elsewhere;

802*e*: determining the non-inductive component as the difference between the start to end voltage and the pickup voltage.

Figure 9:
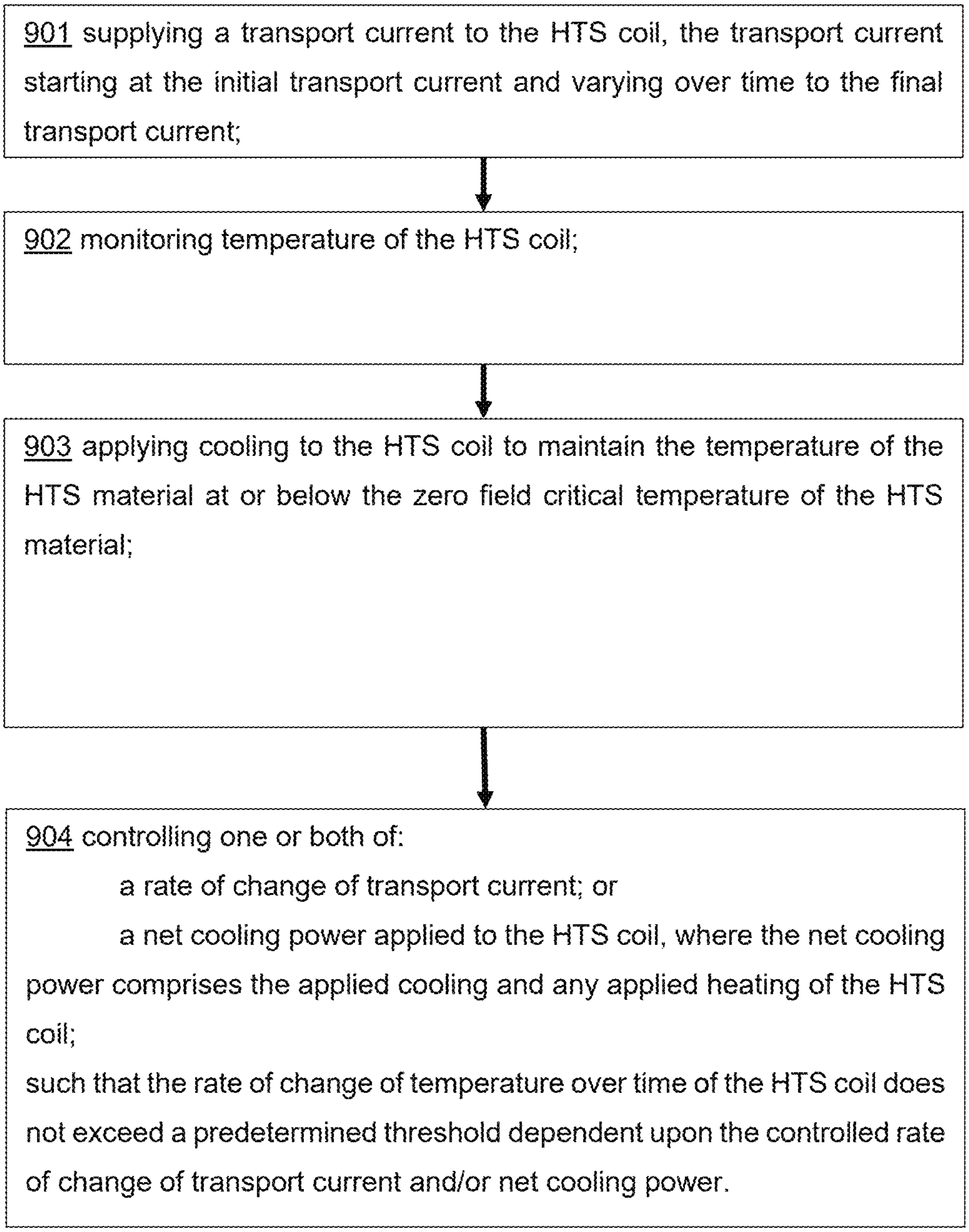
FIG. 9 is a flowchart showing a yet further method of energizing or de-energizing a high temperature superconducting, HTS, coil.

FIG. 9 is a flowchart showing a yet further method of energizing or de-energizing a high temperature superconducting, HTS, coil, from an initial transport current to a final transport current, the HTS coil comprising a plurality of turns of HTS material.

The method comprises:

supplying a transport current to the HTS coil, the transport current starting at the initial transport current and varying over time to the final transport current;

monitoring temperature of the HTS coil;

applying cooling to the HTS coil to maintain the temperature of the HTS material at or below the zero field critical temperature of the HTS material;

controlling one or both of:

- a rate of change of transport current; or
- a net cooling power applied to the HTS coil, where the net cooling power comprises the applied cooling and any applied heating of the HTS coil;

such that the rate of change of temperature over time of the HTS coil does not exceed a predetermined threshold dependent upon the controlled rate of change of transport current and/or net cooling power.

Figure 10:
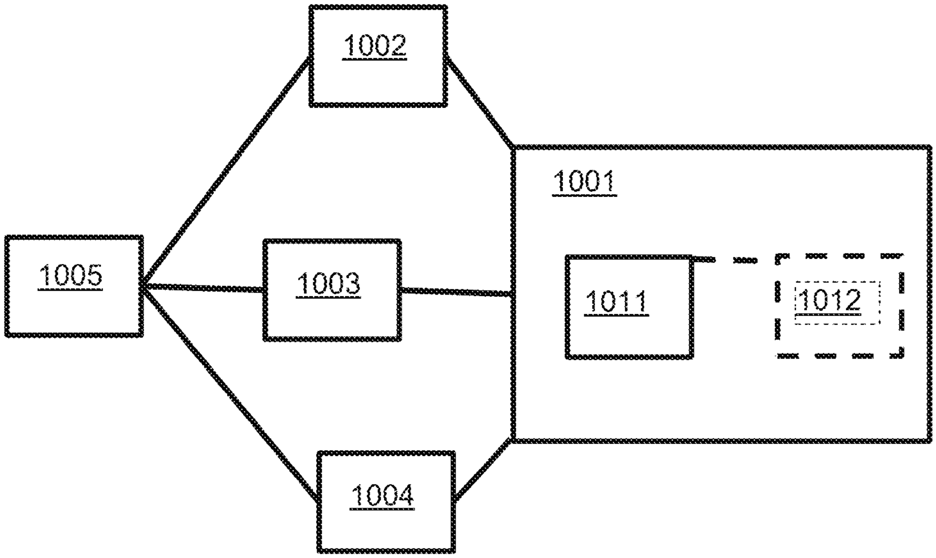
FIG. 10 is a schematic illustration of a high temperature superconducting, HTS, magnet system.

FIG. 10 is a schematic illustration of a high temperature superconducting, HTS, magnet system, in which illustrated connections indicate functional links rather than actual position of components. The HTS magnet system comprises:

an HTS coil 1001 comprising a plurality of turns of HTS material 1011;

a power supply 1002 configured to supply a transport current to the HTS coil;

a cooling system 1003 configured to apply cooling to the HTS coil to maintain the temperature of the HTS material at or below the zero field critical temperature of the HTS material;

a voltage monitoring system 1004 configured to monitor the start-to-end voltage of the HTS coil;

a controller 1005 configured to control ramping of the HTS coil by:

causing the power supply to provide a transport current which starts at an initial transport current and varies over time to a final transport current; and determining the non-inductive component of the monitored start-to-end voltage of the HTS coil;

controlling one or both of:

a rate of change of transport current;

a net cooling power applied to the HTS coil, where the net cooling power comprises the cooling applied by the cooling system and any applied heating of the HTS coil;

such that the non-inductive component of the start-to-end voltage of the HTS coil remains above a threshold at least until the transport current is equal to the final transport current.

The HTS coil may comprise a co-wound pickup coil 1012; wherein the co-wound pickup coil is directly electrically connected at a second end to a second end of the HTS coil, and is not directly electrically connected to the HTS coil elsewhere, and wherein the voltage monitoring system is further configured to monitor a pickup voltage which is the voltage between a first end of the HTS coil and first end of the co-wound pickup coil, and the controller is configured to determine the non-inductive component of the start-to-end voltage based on the monitored start-to-end voltage of the HTS coil and the pickup voltage.

Figure 11:
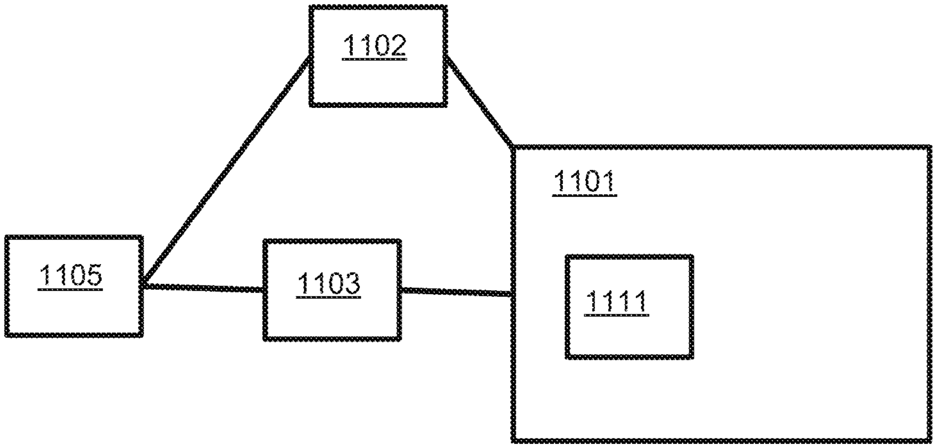
FIG. 11 is a schematic illustration of a further high temperature superconducting, HTS, magnet system.

FIG. 11 is a schematic illustration of a further high temperature superconducting, HTS, magnet system, in which illustrated connections indicate functional links rather than actual position of components. The HTS magnet system comprises:

an HTS coil 1101 comprising a plurality of turns of HTS material 1111;

a power supply 1102 configured to supply a transport current to the HTS coil;

a cooling system 1103 configured to apply cooling to the HTS coil to maintain the temperature of the HTS material at or below the zero field critical temperature of the HTS material;

a controller 1105 configured to control ramping of the HTS coil by:

causing the power supply to provide a transport current which starts at an initial transport current and varies over time to a final transport current;

controlling one or both of:

the rate of change of transport current; or the net cooling power applied to the HTS coil, where the net cooling power comprises the applied cooling and any applied heating of the HTS coil;

such that the rate of change of temperature over time of the HTS coil does not exceed a predetermined threshold dependent upon the controlled rate of change of transport current and/or net cooling power.

The invention claimed is:

1. A method of energizing or de-energizing a high temperature superconducting, HTS, coil, from an initial transport current to a final transport current, the HTS coil comprising a plurality of turns of HTS material, the method comprising:

supplying a transport current to the HTS coil, the transport current starting at the initial transport current and varying over time to the final transport current;

applying cooling to the HTS coil;

monitoring an operating condition of the HTS coil, wherein the operating condition is indicative of a ratio $I/I_c$ of the transport current, I, to a critical current, $I_c$, of the HTS material in at least a part of the HTS coil; and controlling one or both of the transport current applied to the HTS coil and a net cooling applied to the HTS coil in a feedback loop responsive to the operating condition, in order to maintain the operating condition in a desired range during energization or de-energization such that the indicated ratio $I/I_c$ is maintained above a threshold ratio and below 1.

2. The method according to claim 1, wherein the threshold ratio is at least 0.7.

3. The method according to claim 1, wherein the operating condition is a non-inductive component of the start-to-end voltage across the HTS coil.

4. The method according to claim 3, wherein the non-inductive component of the start-to-end voltage across the HTS coil is monitored by monitoring a total start-to-end voltage across the HTS coil and determining the non-inductive component by one of:

subtracting a pre-calculated inductive voltage dependent on a rate of change of transport current;

modelling of the HTS coil, the model taking as input at least the total start-to-end voltage, the transport current, a monitored temperature of the HTS coil, and a monitored magnetic field produced by the HTS coil; or determining the non-inductive component as a difference between the total start-to-end voltage and a voltage across a pickup coil co-wound or inductively coupled with the HTS coil.

5. The method according to claim 1, wherein the operating condition is indicative that current in the HTS material of at least part of the HTS coil is spilling into adjacent non-superconducting material.

6. The method according to claim 5, wherein the operating condition is a rate of change of temperature of the HTS coil with time, and the rate of change of temperature is maintained within a desired range dependent upon a rate of change of the transport current and/or the net cooling.

7. The method according to claim 1, wherein controlling the net cooling comprises one or both of:

controlling cooling applied to the HTS coil;

applying heating to the HTS coil.

8. A method of energizing or de-energizing a high temperature superconducting, HTS, coil, from an initial transport current to a final transport current, the HTS coil comprising a plurality of turns of HTS material, the method comprising:

supplying a transport current to the HTS coil, the transport current starting at the initial transport current and varying over time to the final transport current;

monitoring a non-inductive component of the start to end voltage across the HTS coil;

applying cooling to the HTS coil to maintain the temperature of the HTS material at or below the zero field critical temperature of the HTS material; and controlling one or both of:

a rate of change of transport current; or a net cooling power applied to the HTS coil, where the net cooling power comprises the applied cooling and any applied heating of the HTS coil;

such that the non-inductive component of the start-to-end voltage across the HTS coil remains above a threshold at least until the transport current is equal to the final transport current.

9. The method according to claim 8, wherein monitoring the non-inductive component comprises monitoring a total start to end voltage of the HTS coil and determining the non-inductive component by one of:

subtracting a pre-calculated inductive voltage dependent on the rate of change of transport current;

modelling of the HTS coil, the model taking as input at least the total start to end voltage, the transport current, a monitored temperature of the HTS coil, and a monitored magnetic field produced by the HTS coil.

10. The method according to claim 8, wherein monitoring the non-inductive component comprises:

monitoring a total start to end voltage of the HTS coil;

monitoring a pickup voltage which is the voltage between a first end of the HTS coil and first end of a co-wound pickup coil, wherein the pickup coil is directly electrically connected at a second end to the second end of the HTS coil, and is not directly electrically connected to the HTS coil elsewhere;

determining the non-inductive component as the difference between the start to end voltage and the pickup voltage.

11. The method according to claim 8, wherein the non-inductive start-to-end voltage of the HTS coil remains above 0.5 microVolts per meter of length of the HTS material of the HTS coil, μV/m, more preferably above 1 μV/m, more preferably above 10 μV/m, more preferably above 100 μV/m.

12. A method of energizing or de-energizing a high temperature superconducting, HTS, coil, from an initial transport current to a final transport current, the HTS coil comprising a plurality of turns of HTS material, the method comprising:

supplying a transport current to the HTS coil, the transport current starting at the initial transport current and varying over time to the final transport current;

monitoring temperature of the HTS coil;

applying cooling to the HTS coil to maintain the temperature of the HTS material at or below the zero field critical temperature of the HTS material; and controlling one or both of:

a rate of change of transport current; or a net cooling power applied to the HTS coil, where the net cooling power comprises the applied cooling and any applied heating of the HTS coil;

such that the rate of change of temperature over time of the HTS coil does not exceed a predetermined threshold dependent upon the controlled rate of change of transport current and/or net cooling power.

13. The method according to claim 12, wherein the HTS coil is being energized and comprising maintaining the rate of change of temperature at a constant negative value.

14. The method according to claim 12, comprising heating the HTS coil with heaters, and wherein controlling the net cooling power comprises adjusting the power of the heaters.

15. The method according to claim 12, wherein the HTS coil is being energized, the initial transport current is less than the final transport current, and the predetermined threshold is negative.

16. A high temperature superconducting, HTS, magnet system, the HTS magnet system comprising:

an HTS coil comprising a plurality of turns of HTS material;

a power supply configured to supply a transport current to the HTS coil;

a cooling system configured to apply cooling to the HTS coil to maintain the temperature of the HTS material at or below the zero field critical temperature of the HTS material;

a voltage monitoring system configured to monitor the start-to-end voltage of the HTS coil;

a controller configured to control ramping of the HTS coil by:

causing the power supply to provide a transport current which starts at an initial transport current and varies over time to a final transport current; and determining the non-inductive component of the monitored start-to-end voltage of the HTS coil; and controlling one or both of:

a rate of change of transport current;

a net cooling power applied to the HTS coil, where the net cooling power comprises the cooling applied by the cooling system and any applied heating of the HTS coil;

such that the non-inductive component of the start-to-end voltage of the HTS coil remains above a threshold at least until the transport current is equal to the final transport current.

17. The HTS magnet system according to claim 16, wherein the HTS coil comprises a co-wound pickup coil; wherein the co-wound pickup coil is directly electrically connected at a second end to a second end of the HTS coil, and is not directly electrically connected to the HTS coil elsewhere, and wherein the voltage monitoring system is further configured to monitor a pickup voltage which is the voltage between a first end of the HTS coil and first end of the co-wound pickup coil, and the controller is configured to determine the non-inductive component of the start-to-end voltage based on the monitored start-to-end voltage of the HTS coil and the pickup voltage.

18. The HTS magnet system according to claim 16, wherein the controller is configured to control the net cooling power applied to the HTS coil by one or more of:

causing the cooling system to adjust cooling provided to the HTS coil;

supplying current to one or more heaters in thermal contact with the HTS coil, wherein the HTS magnet system comprises the one or more heaters.

19. A high temperature superconducting, HTS, magnet system, the HTS magnet system comprising:

an HTS coil comprising a plurality of turns of HTS material;

a power supply configured to supply a transport current to the HTS coil;

a cooling system configured to apply cooling to the HTS coil to maintain the temperature of the HTS material at or below the zero field critical temperature of the HTS material;

a controller configured to control ramping of the HTS coil by:

causing the power supply to provide a transport current which starts at an initial transport current and varies over time to a final transport current; and controlling one or both of:

the rate of change of transport current; or the net cooling power applied to the HTS coil, where the net cooling power comprises the applied cooling and any applied heating of the HTS coil;

such that the rate of change of temperature over time of the HTS coil does not exceed a predetermined threshold dependent upon the controlled rate of change of transport current and/or net cooling power.

20. The HTS magnet system according to claim 19, wherein the controller is configured to control the rate of change of transport current and/or net cooling power, such that the rate of change of temperature is maintained at a constant negative value.

* * * * *